United States Patent
Taylor

[45] 3,703,332
[45] Nov. 21, 1972

[54] LIGHT MODULATOR AND DISPLAY DEVICE

[72] Inventor: George William Taylor, Princeton, N.J.

[73] Assignee: RCA Corporation

[22] Filed: March 30, 1971

[21] Appl. No.: 129,393

[52] U.S. Cl. ..........................350/160 CR, 40/106.21
[51] Int. Cl................................................G02f 1/30
[58] Field of Search ...350/160, 267, 312; 40/106.21; 73/356

[56] References Cited

UNITED STATES PATENTS

| | | | |
|---|---|---|---|
| 1,862,622 | 6/1932 | Hoffman | 350/160 |
| 3,107,529 | 10/1963 | Johnston, Jr. | 350/160 |
| 3,415,591 | 12/1968 | Letter | 350/160 |

*Primary Examiner*—David Schonberg
*Assistant Examiner*—J. Rothenberg
*Attorney*—G. H. Bruestle

[57] ABSTRACT

A device which can be switched between a light-scattering and a non light-scattering condition comprises, in an element thereof, a volatile liquid and a container having a front viewing face and a darkened back face. The front viewing face has a rough inner surface with a transparent thin resistive layer over the rough surface. The resistive layer takes on the rough surface configuration of the front face. In operation, a current is passed through the resistive layer to heat the volatile liquid until it boils. The rough surface provides a multiplicity of nucleation sites for boiling of the liquid. When the liquid boils, the device scatters light and appears white to the viewer. When the liquid is in its quiescent state, light passes through the front face and the liquid without substantial scattering and the device appears dark due to the darkened back face.

10 Claims, 6 Drawing Figures

PATENTED NOV 21 1972    3,703,332

INVENTOR
George W. Taylor
BY
ATTORNEY

LIGHT MODULATOR AND DISPLAY DEVICE

BACKGROUND OF THE INVENTION

This invention relates to light modulators and display devices.

Various techniques have been used in the past to modulate a light beam. For example, electro-optic and magneto-optic devices such as devices depending upon the Kerr Effect and the Faraday Effect have been employed as light modulators. These devices have the disadvantage of requiring high quality large crystals and generally require high driving voltages or currents. They are also often limited to operation with polarized light. Mechanical light modulators are also known in the art. However, such light modulators are generally subject to wear. More recently, electro-optical liquid crystal light modulating devices have been described in the art. These devices modulate light by varying the degree of scattering of light impinging on the liquid crystal element of the devices. While these light modulating devices have many advantages over other prior art devices, the liquid crystal material employed in these devices tends to degrade over a period of time. The new type of light modulator disclosed herein is also based upon the scattering of light. However, in this novel device the light scattering is caused by evaporation of a liquid at a liquid-solid interface. Light scattering occurs due to the formation of small bubbles at the interface. The novel device can make use of inexpensive liquids which do not degrade with time.

SUMMARY OF THE INVENTION

A device which can be switched between a light-scattering and a non-light-scattering condition comprises a volatile liquid in a container, said container having a front viewing face of a transparent material with a thin transparent electrically resistive coating thereon. This coating is used for heating the volatile liquid in the container to its vaporization point. The surface of the coating in contact with the liquid is highly non-planar, that is rough, so as to provide a multiplicity of nucleation points for vaporization of the volatile liquid and also to provide a geometry for light scattering.

DETAILED DESCRIPTION OF THE INVENTION

Figure 1:
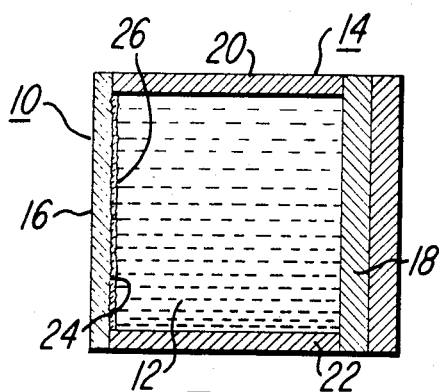
FIG. 1 is a side elevational cross-sectional view of a simple single cell version of the novel device.

Referring to FIG. 1, there is shown a simple embodiment of a novel light-scattering element 10. In this embodiment, a volatile liquid 12, such as trichloroethylene is held in a container 14. The container 14 comprises front and back faces 16 and 18, respectively, and top and bottom faces 20 and 22, respectively.

Top face 20 of the container 14 may be solid or may be perforated to allow escape of vapors. The back face 18 of the container 14 may either be transparent, reflective or absorptive to light entering the container. In order to obtain maximum contrast ratio and eliminate unwanted reflected images, the back face 18 is preferably black. A black back face can be provided by utilizing a material which is itself black such as an essentially black filter glass, or one may coat the back face 18 with a material which is black, for example, a black paint. Where the coating is in contact with the volatile liquid it should be non-reactive therewith.

The surface 24 of the front face 16 nearest the volatile liquid 12 is roughened or frosted. This roughened surface may be provided, for example, by etching, sand blasting, or coating the surface with a sand like finish to give that surface a frosted effect in air.

A transparent, electrically resistive coating 26 is provided over the rough surface 24 of the front face 16. This coating which may consist of, for example, tin oxide, indium oxide or a thin metallic film, follows and maintains the contour of the rough surface of the front face 16 thereby providing a multiplicity of vapor nucleation sites.

It should be noted that the front face of the device in combination with the resistive coating thereon appears essentially transparent when wet with the liquid which preferably should have an index of refraction the same as or close to the index of refraction of the front face. However, due to the rough light-scattering surface of these otherwise transparent materials, the regions of the coating not wet by the liquid appear translucent.

In operation, prior to passing a current through the resistive coating, the volatile liquid 12 wets the rough surface of the coating 26 and the front face appears transparent. When the back face of the device is black, (or when the liquid is dark or black), the device will appear black to an observer. An electric current is then passed through the electrically resistive coating 26 by means of electrodes (not shown) sufficient to heat the volatile liquid 12 to its boiling point and to provide the latent heat of vaporization to boil the liquid. The rough surface in contact with the liquid 12 provides a multiplicity of nucleation sites for vaporization or boiling of the liquid thereby causing the liquid to form a multiplicity of tiny bubbles at the interface of the resistive coating 26 and the liquid 12. Since the index of refraction of the vapor differs from that of the liquid (typically at 50 percent difference), each bubble provides a light-scattering center. In addition, light scattering is also caused by the fact that the liquid no longer wets the frosted surface of the device which therefore appears translucent. Consequently, the device appears whitish or translucent and the observer can no longer see the black background of the back face 18.

For optimum results, the refractive index of the liquid should substantially match the refractive index of the front face. If the resistive coating is thick and/or substantially different in refractive index as compared to the refractive indices of the liquid and the front face, corrective quarter wave coatings may be employed.

Figure 2:
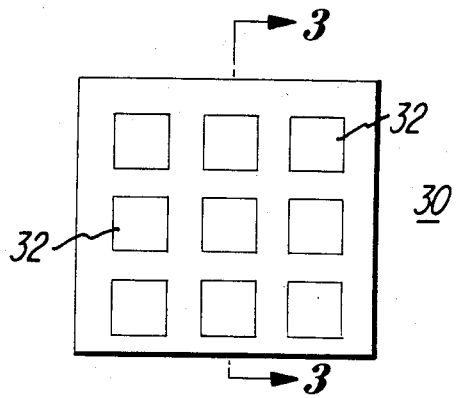
FIG. 2 is a front elevational view of a segmented device having a plurality of light-scattering elements.
Figure 3:
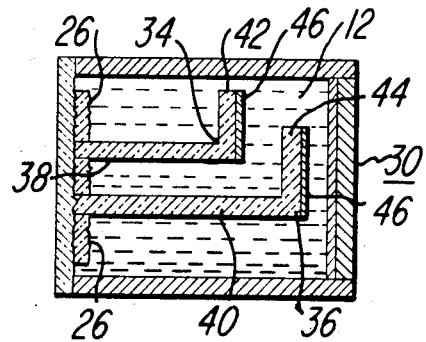
FIG. 3 is a side cross-sectional view of the device shown in FIG. 2 taken along plane 3—3.

Referring now to FIGS. 2 and 3, there is shown a segmented or matrix type of device 30 having a plurality of light-scattering elements 30 similar to the light scattering element described with reference to FIG. 1. As can be seen in FIG. 2, the device 32 as described has nine elements, three rows and three columns. While a device of only nine elements is shown, a device of any number of elements can be made.

In order to prevent the bubbles formed from elements in a lower row of the matrix from interfering with the information to be depicted by any of the elements above them, baffles 34 and 36 are provided which extend across the device between each row of elements to prevent the bubbles from a lower row from intermixing with the volatile liquid 12 associated with any of the elements above them. The baffles 34 and 36, as shown in FIG. 3, are in the shape of L's held on their side with the respective sides of the L's parallel to each other. The long sides 38 and 40 of the L-shaped baffles are shown to extend essentially horizontally from the front plate of the display device toward, but not as far as, the rear plate of the device. The horizontal portions of the baffles 34 and 36 are placed between the rows of the display elements. Also, the horizontal portions of the baffles are preferably tilted slightly upward from the horizontal so that the bubbles rising to their lower surface will flow toward the back of the device and eventually up into the top of the device. The short sides 42 and 44 of the L-shaped baffles 34 and 36, which are essentially perpendicular to the almost horizontal portions of the baffles, extend from the end of the horizontal portions upward toward the top of the device. These parts of the baffles are preferably black such that the bubbles behind them cannot be seen through the front face of the device. They can be made black, if necessary, by means of a coating 46 on a surface thereof.

The lower of the L-shaped baffles 36 is longer in the horizontal direction than the upper baffle 34 and the vertical part 44 of the lower baffle 36 extends such that it overlaps the vertical part 42 of the upper baffle 34, thereby insuring that the bubbles from the lower cells do not mix with the liquid in the region of any of the upper cells.

The baffles may be attached to the front face, for example, by means of a cement, by fusing the baffles to the face or by providing slots in the front face into which the baffle is mounted.

In order to prevent interference due to lateral spreading of the bubbles along a given row, one may also incorporate row dividers (not shown) in the device to form a physical barrier thereby preventing lateral migration of the bubbles.

Figure 4:
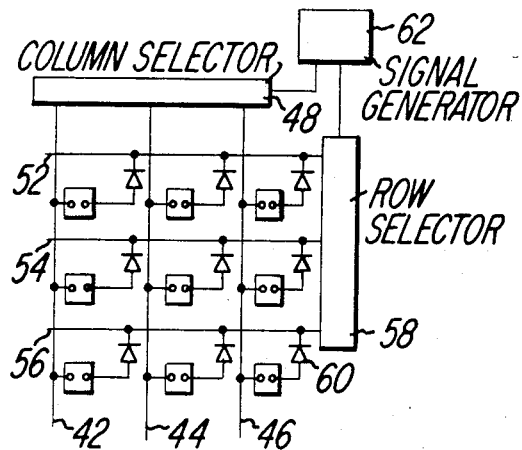
FIG. 4 is a schematic diagram indicating a circuit for operating the segmented display of FIG. 2.

FIG. 4 is a schematic diagram of a circuit for operating the segmented matrix display of FIGS. 2 and 3. A matrix of column conductors 42, 44 and 46 and row conductors 52, 54 and 56 is shown to be coupled to a column selector 48 and row selector 58 respectively. The resistive heating element 26 which actuates each display element is serially connected with a control element 60 such as a diode. Each series combination of heating element 26 and diode 60 is connected between a given column conductor and a given row conductor. In order to activate any given display element, a signal is provided by means of, for example, a signal generator 62 to the column conductor and row conductor across which said cell is connected.

The display may be addressed a row at a time where the row is positively biased when not selected and at 0 volts when selected. The row bias voltage, $+V_1$-is chosen to be greater than $+V_2$, the maximum column signal. The column signals may represent video information and for an on-off display may have a value of 0 volts when the element being addressed is to be set into its "off" condition and $+V_2$ volts when the element is to be set into its "on" condition. In accordance with the above condition, the diodes 60 of the elements in the unselected rows are always biased off and hence little or no current flows through the electrical heaters in series with these diodes. Alternatively, when a row is selected, then the diodes in the elements of the row are opened and if $+V_2$ is present on a column, a current will flow through the diode and the electric heater in series with said diode. The electrical parameters are chosen so that this current is sufficient to heat the resistive heater to a temperature which is capable of vaporizing the liquid adjacent the heater. For best operation, the resistance of the heater should be between the forward and back resistance of the diode.

There are still other ways for matrix addressing a novel display as disclosed herein. For example, one matrix addressing scheme is based upon the fact that the heat maintained to vaporize the liquid may be said to consist of two parts. Firstly, there is the heat $H_B$ needed to raise the temperature of the liquid from ambient to its boiling temperature, and secondly, the latent heat $H_L$ needed to vaporize the liquid which is at its boiling temperature. The values of $H_B$ and $H_L$ depend upon the particular liquid employed. Turpentine, for example, for an ambient temperature of 20°C and at atmospheric pressure has an $H_B$ value of 56 calories/gram and an $H_L$ value of 69 calories/gram.

Figure 5:
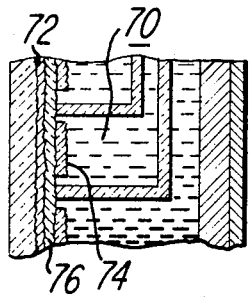
FIG. 5 is a cross-sectional view of a portion of a device element of still another embodiment of the invention.

As shown in FIG. 5, which is a cross-sectional view through one element of a novel matrix display, each element 70 comprises two thin transparent heating elements 72 and 74 separated by a thin transparent insulating layer 76, which may be formed, for example, from silicon dioxide. One heating element 74 is connected to a row conductor and the other heating element to a column conductor. The row and column heating electrodes of the element could alternatively be placed alongside and interleaved with each other rather than on top of each other as shown in FIG. 5.

In operation, voltages are selected, for example, that the electrical energy applied to the selected row is sufficient to provide $H_B$ units of heat to each of the heating elements in that row. Correspondingly, it is arranged that the electric energy applied to a selected column is sufficient to provide $H_L$ units of heat to each heating element in that column. Thus, matrix selection is possible since only the element common to both the selected row and selected column receives $H_L + H_B$ units of heat, the amount of heat needed to vaporize and create the "on" condition. By comparison, the half-selected elements receive either $H_L$ or $H_B$ units of heat and the unselected elements receive zero heat. Thus, the half-selected and unselected elements remain unvaporized or in the "off" condition. The total heat energy to cause vaporization need not necessarily be divided on the basis of $H_B$ units to the row heaters and $H_L$ units to the column heaters of the device. The only requirement which must be met is that the combined energy of the row and column must be $H_B + H_L$ while the individual energy of the row or column must be < $H_B$ + $H_L$. It may be noted that the response time of the device can be improved by maintaining a constant bias on all elements < $H_B + H_L$ units of heat whereby a small signal will cause heating to $H_B + H_L$ units. In this manner, little or no time will be expended in bringing the liquid to a boil.

Figure 6:
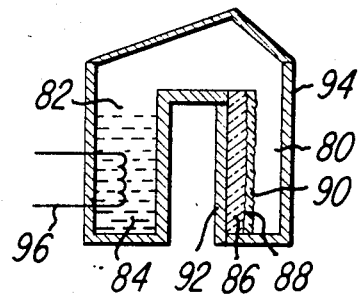
FIG. 6 is a cross-sectional view of still another embodiment.

In another embodiment shown in FIG. 6, the device element comprises two interconnected compartments 80 and 82. One compartment 80 provides the display area of the device while the other compartment 82 provides a reservoir for volatile liquid 84. In this embodiment, the display compartment consists of a glass support 86 having a frosted inner surface 88 with a thin transparent heater 90 thereover and a black background 92 on the side of the support 86 opposite the frosted surface 88.

A front support plate 94 is provided which is spaced in the order of 2–3 mils from the frosted glass surface 88. The reservoir compartment of the device includes a heater 96 such as a nichrome heater to vaporize the liquid from the reservoir and transfer it by means of vaporization and subsequent condensation to the display portion of the device between the front support plate 94 and the frosted glass surface 88.

In operation, a 2–3 mil film of the liquid fills the display compartment of the device and the viewer observes the black background. This may be called the "off" condition of the device. To activate the element into its "on" condition (shown in FIG. 6), a voltage is applied to the thin transparent heating electrode which vaporizes the liquid and causes it to condense in the reservoir. Without liquid in the display area, the display element remains in its "on" condition and hence stores the information. In order to return the device to its "off" condition, a current is passed through the nichrome heater so as to boil the liquid in the reservoir causing it to condense back into the display compartment.

The embodiments discussed above indicated a preference for a dark or black background to optimize the contrast ratio of the novel device. The desired background can be provided by using a liquid which is highly colored.

Gray scale can be achieved in the novel devices by either amplitude or time modulation of the signal applied to the heating elements of the device. Generally, gray scale is achieved by varying the quantity of vaporization of the liquid and hence the amount of scattering achieved.

What I claim is:

1. A device which can be switched between a light scattering and a non-light-scattering condition comprising a volatile liquid in a container, said container having a front face of a transparent material with heating means thereon, said heating means adjacent said volatile liquid and having a rough surface in contact with said liquid so as to provide a multiplicity of nucleation sites for vaporization of said volatile liquid.

2. The light-scattering device recited in claim 1 wherein said front face has a rough inner surface and wherein said heating means comprises a thin transparent resistive coating on said rough surface said coating taking on a similar rough surface.

3. The light scattering device recited in claim 1 including means for providing a dark background when viewing said device through said front face below the boiling point of said liquid.

4. A matrix type light modulator and display device comprising
   a. a volatile liquid in a container, said container comprising a front viewing face having a rough inner surface,
   b. a plurality of display elements, said display elements being spaced from each other and comprising a thin transparent heating element as a coating on said rough surface of said front face,
   c. row conductors and column conductors for driving selected rows and columns of display elements,
   d. means for preventing mixing of bubbles caused by vaporization of said volatile liquid in one display element with the volatile liquid in another display element.

5. The device recited in claim 4 wherein said means for preventing mixing comprises an L-shaped baffle between each row of display elements.

6. The device recited in claim 4 including as the means for preventing mixing of bubbles from one display element with the liquid of another display element, L-shaped baffles between each row of display elements, each of said L-shaped baffles consisting of a horizontal member extending from said front face toward the rear of said container and a vertical member extending upwardly from the end of said horizontal member, the vertical member of a lower baffle extending behind and spaced from the vertical member of the baffle above it, said vertical members being opaque.

7. The device recited in claim 4 wherein each element comprises a transparent heater and a current control device in series connection, said series connection coupled across a row conductor and a column conductor.

8. The matrix type light modulator and display device recited in claim 4 including at each display element a transparent column heating element and a transparent row heating element separated by a transparent insulating layer, the surface in contact with the volatile liquid of the display element being rough so as to provide a multiplicity of nucleation sites for boiling of said liquid, said boiling being caused by the combination of electrical energy applied to said column and said row heating elements.

9. A light modulating device comprising two interconnected compartments, one compartment providing a display area and the other a reservoir compartment containing a volatile liquid, said reservoir compartment having a heater therein to cause vaporization of said liquid from said reservoir to said display compartment, said display compartment comprising a transparent front face plate and a darkened back member spaced therefrom, a heating element in the form of a thin coating on an inner surface of said display compartment, said heating element having a roughened surface.

10. The device recited in claim 9 wherein said transparent front face and said back member of said display compartment which can fill with volatile liquid are separated by a distance of from 1–3 mils.

* * * * *